N. Willhide,

Tire Bender.

No. 95,398. Patented Sep. 28, 1869.

Witnesses:
C. A. Petit
A. M. Tanner

Inventor:
N. Willhide
By Munn & Co.
Attorneys.

United States Patent Office.

WILLIAM WILLHIDE, OF FETTERMAN, WEST VIRGINIA.

Letters Patent No. 95,398, dated September 28, 1869.

IMPROVED TIRE-BENDER.

The Schedule referred to in these Letters Patent and making part of the same.

*To all whom it may concern:*

Be it known that I, WILLIAM WILLHIDE, of Fetterman, in the county of Taylor, and State of West Virginia, have invented a new and improved Tire-Bender; and I do hereby declare that the following is a full, clear, and exact description of the construction and operation of the same, reference being had to the accompanying drawings, making a part of this specification, in which—

Figure 1:
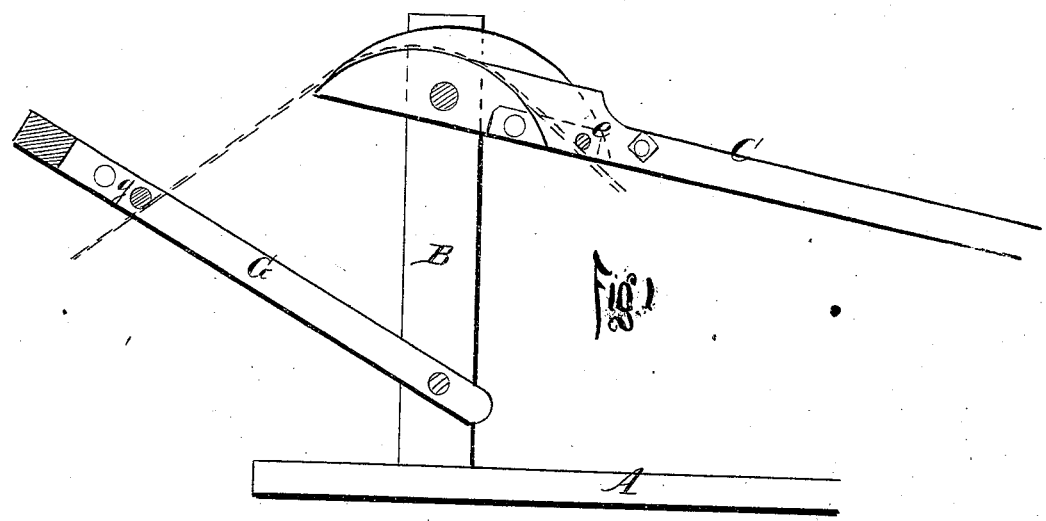
Figure 1 is a vertical section.
Figure 2:
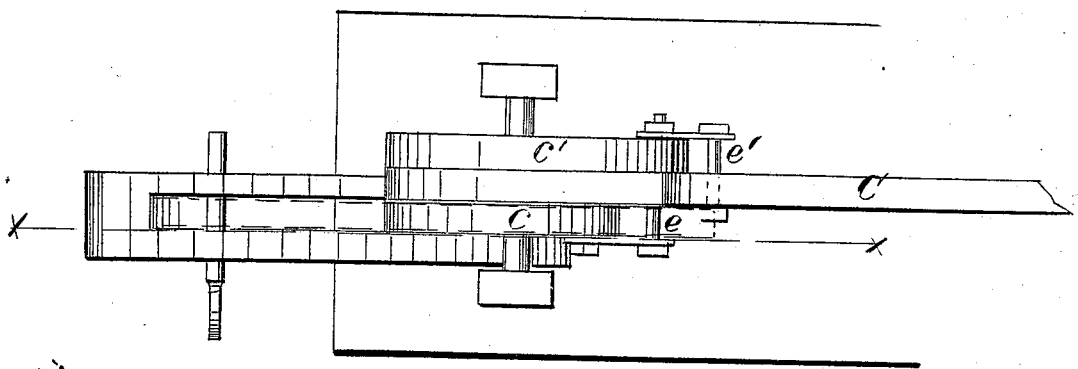
Figure 2 is a top view.

The object of this invention is to provide a simple, convenient, and effective apparatus for the purpose of bending tires, and other metallic bars.

In the drawings—

A is the base plate.

B is a stout standard attached thereto.

C is a lever, pivoted near the upper end of standard B, and provided with eccentric cams $c\ c'$, of different sizes and shapes, on each side.

$e\ e'$ are pins on the lever, near the end of the cams, under which one end of the tire or bar is held, as shown in the drawings.

G is a slotted plate or lever, pivoted to standard B, at $b$, and provided with one or more pins $g$, under which the end of the tire extends, which pins may be adjusted in different positions at pleasure.

The tire is inserted under the pin on lever C, and its outer end under the pin $g$, the part G being nearly or quite erect at the time.

The lever C is then brought down, bending the tire over the cam $c$ or $c'$, and causing it to conform to the curve of the cam.

After this, the part G may be forced down to the position shown in fig 1, or lower, binding the tire over the opposite end of the cam.

The tire may then be slipped along further, and the operation repeated.

The whole device is exceedingly simple and cheap, and can be made and operated by any person of ordinary mechanical skill.

Having thus described my invention,

What I claim as new, and desire to secure by Letters Patent, is—

The combination and arrangement of the levers C G, having the cams and pins, with the supporting frame A B, when the several parts are constructed to operate together, substantially as and for the purposes specified.

WM. WILLHIDE.

Witnesses:
J. M. SCROGIN,
F. J. CATHER.